(12) United States Patent
Lee

(10) Patent No.: US 11,120,567 B2
(45) Date of Patent: Sep. 14, 2021

(54) DEPTH MAP GENERATION DEVICE FOR MERGING MULTIPLE DEPTH MAPS

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 16/842,791

(22) Filed: Apr. 8, 2020

(65) Prior Publication Data

US 2020/0234460 A1    Jul. 23, 2020

Related U.S. Application Data

(63) Continuation of application No. 15/937,797, filed on Mar. 27, 2018, now Pat. No. 10,650,542.
(Continued)

(51) Int. Cl.
*G06T 7/593*    (2017.01)
*H04N 13/204*    (2018.01)
(Continued)

(52) U.S. Cl.
CPC ............... *G06T 7/596* (2017.01); *G06T 3/40* (2013.01); *G06T 5/006* (2013.01); *G06T 5/50* (2013.01); *G06T 7/593* (2017.01); *H04N 5/23238* (2013.01); *H04N 13/111* (2018.05); *H04N 13/204* (2018.05); *H04N 13/239* (2018.05); *H04N 13/25* (2018.05); *H04N 13/254* (2018.05); *H04N 13/282* (2018.05); *H04N 13/296* (2018.05); *G06T 2207/10028* (2013.01);
(Continued)

(58) Field of Classification Search
CPC . G06T 2207/10028; G06T 2207/20221; G06T 2207/20228; G06T 2219/2016; G06T 3/40; G06T 5/006; G06T 7/596; G06T 5/50; G06T 5/93; H04N 2013/0081; H04N 5/23238; H04N 13/204; H04N 13/282; H04N 13/25; H04N 13/111; H04N 13/239; H04N 13/254; H04N 13/296
USPC .................................................. 382/154, 284
See application file for complete search history.

(56) References Cited

U.S. PATENT DOCUMENTS 10,872,396 B2 * 12/2020 Bartels ....................... G06T 7/30
2012/0056982 A1 * 3/2012 Katz ........................ G06T 7/521
348/43

(Continued)

FOREIGN PATENT DOCUMENTS

TW    201640882 A    11/2016
TW    I567693 B    1/2017

*Primary Examiner* — Daniel G Mariam
(74) *Attorney, Agent, or Firm* — Winston Hsu

(57) ABSTRACT

A depth map generation device for merging multiple depth maps includes at least three image capturers, a depth map generator, and a mixer. The at least three image capturers form at least two image capture pairs. The depth map generator is coupled to the at least three image capturers for generating a depth map corresponding to each image capturer pair of the at least two image capture pairs according to an image pair captured by the each image capturer. The mixer is coupled to the depth map generator for merging at least two depth maps corresponding to the at least two image capturer pairs to generate a final depth map, wherein the at least two depth maps have different characteristics.

9 Claims, 5 Drawing Sheets

Related U.S. Application Data

(60) Provisional application No. 62/479,331, filed on Mar. 31, 2017.

(51) Int. Cl.
*H04N 13/282* (2018.01)
*H04N 5/232* (2006.01)
*H04N 13/25* (2018.01)
*H04N 13/296* (2018.01)
*H04N 13/239* (2018.01)
*H04N 13/254* (2018.01)
*H04N 13/111* (2018.01)
*G06T 3/40* (2006.01)
*G06T 5/50* (2006.01)
*G06T 5/00* (2006.01)
*H04N 13/00* (2018.01)

(52) U.S. Cl.
CPC .............. *G06T 2207/20221* (2013.01); *G06T 2207/20228* (2013.01); *G06T 2219/2016* (2013.01); *H04N 2013/0081* (2013.01)

(56) References Cited

U.S. PATENT DOCUMENTS

| | | | |
|---|---|---|---|
| 2014/0198977 A1* | 7/2014 | Narasimha | G06T 5/007 382/154 |
| 2015/0116460 A1 | 4/2015 | Jouet | |
| 2015/0235351 A1 | 8/2015 | Mirbach | |
| 2017/0337703 A1 | 11/2017 | Wu | |
| 2018/0091798 A1* | 3/2018 | Chang | H04N 13/271 |
| 2018/0176542 A1 | 6/2018 | Atanassov | |

* cited by examiner

DEPTH MAP GENERATION DEVICE FOR MERGING MULTIPLE DEPTH MAPS

CROSS REFERENCE TO RELATED APPLICATIONS

This is a continuation application of U.S. patent application Ser. No. 15/937,797, filed on Mar. 27, 2018, which claims the benefit of U.S. Provisional Application No. 62/479,331, filed on Mar. 31, 2017.

BACKGROUND OF THE INVENTION

1. Field of the Invention

The present invention relates to a depth map generation device for fusing (merging) multiple depth maps, and particularly to a depth map generation device that can fuse depth maps with at least two characteristics.

2. Description of the Prior Art

Generally speaking, a valid area of a depth map with higher accuracy (e.g. corresponding to a long baseline) is narrower than a valid area of a depth map with lower accuracy (e.g. corresponding to a short baseline), so a user may choose the depth map with lower accuracy because of needing a larger valid area (that is, the depth map with higher accuracy will be given up). Therefore, a depth engine provided by the prior art can enlarge a valid area of a depth map generated by the depth engine through a predetermined conditional judgment. For example, the depth engine can make the depth map generated by the depth engine have lower accuracy through the predetermined conditional judgment, wherein the predetermined conditional judgment corresponds to tradeoff between accuracy and a range of a valid area corresponding to a depth map. That is, the depth engine can either make the depth map generated by the depth engine have larger valid area (but have lower accuracy), or make the depth map generated by the depth engine have smaller valid area (but have higher accuracy) through the predetermined conditional judgment. That is, the depth engine cannot generate a depth map simultaneously with different characteristics (e.g. accuracy and a range of a valid area) through the predetermined conditional judgment. Therefore, the prior art is not a good technical solution for the user.

SUMMARY OF THE INVENTION

An embodiment of the present invention provides a depth map generation device for merging multiple depth maps. The depth map generation device includes at least two image capturers, a light source, a depth map generator, and a mixer. The light source is used for emitting structured light, wherein the light source and the at least two image capturers form at least two image capture pairs, respectively. The depth map generator is coupled to the at least two image capturers for generating a depth map corresponding to each image capturer pair of the at least two image capture pairs according to an image comprising the structured light captured by the each image capturer pair. The mixer is coupled to the depth map generator for merging at least two depth maps corresponding to the at least two image capture pairs to generate a final depth map, wherein the at least two depth maps have different characteristics.

Another embodiment of the present invention provides a depth map generation device for merging multiple depth maps. The depth map generation device includes an image capture module, a depth map generator, and a mixer. The image capture module includes at least two image capture pairs, and each image capturer pair of the at least two image capture pairs is composed of two image capturers, or composed of an image capturer and a light source. The depth map generator is coupled to the image capture module for generating at least two depth maps corresponding to the at least two image capture pairs according to images captured by the at least two image capture pairs. The mixer is coupled to the depth map generator for merging the at least two depth maps to generate a final depth map, wherein the at least two depth maps have different characteristics.

The present invention provides a depth map generation device for fusing (merging) multiple depth maps. The depth map generation device utilizes at least three image capturers (or at least two image capturers and a light source) to generate at least two depth maps corresponding to at least two baselines, wherein the at least two depth maps corresponding to the at least two baselines have at least two characteristics. Then, the present invention can generate a final depth map by fusing the at least two depth maps with the at least two characteristics. Therefore, compared to the prior art, the present invention can enlarge a range of the final depth map, or increase accuracy of the final depth map.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
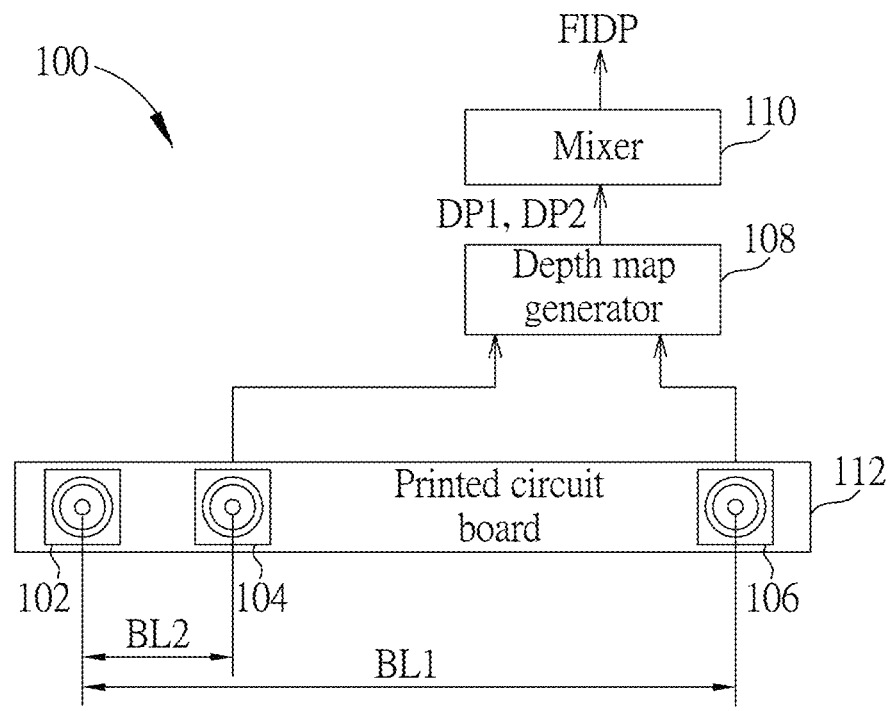
FIG. 1 is a diagram illustrating a depth map generation device for merging multiple depth maps according to a first embodiment of the present invention.
Figure 2:
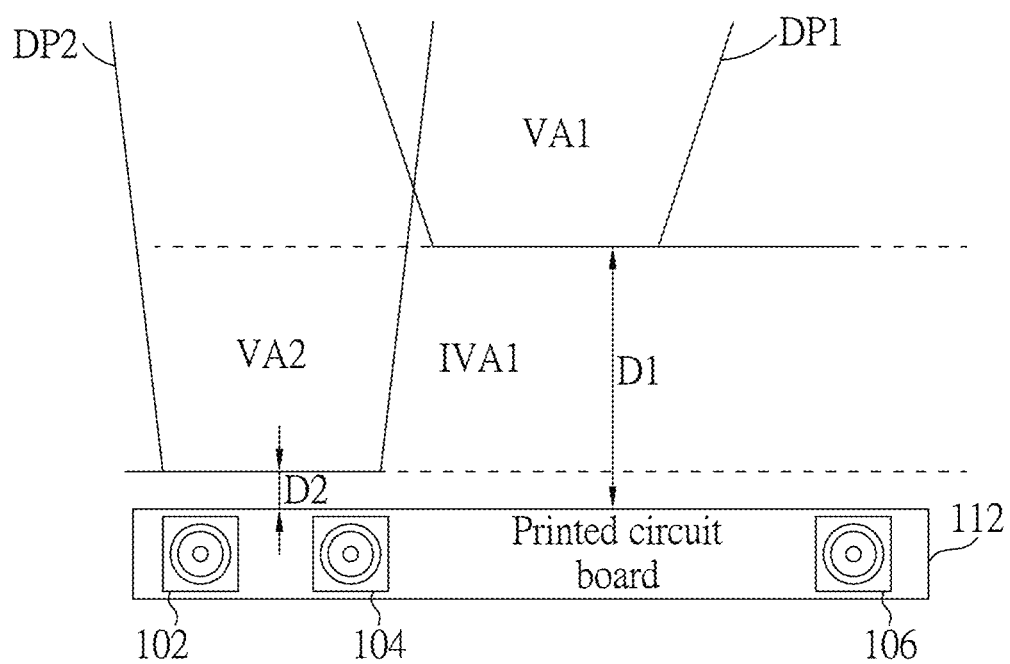
FIG. 2 is a diagram illustrating effective ranges of depth maps corresponding to two different resolutions.

Please refer to FIGS. 1, 2. FIG. 1 is a diagram illustrating a depth map generation device 100 for merging multiple depth maps according to a first embodiment of the present invention, and FIG. is a diagram illustrating effective ranges of depth maps corresponding to two different resolutions. As shown in FIG. 1, the depth map generation device 100 includes three image capturers 102, 104, 106, a depth map generator 108, and a mixer 110. But, the present invention is not limited to the depth map generation device 100 only including the three image capturers 102, 104, 106. That is, the depth map generation device 100 can include more than four image capturers. As shown in FIG. 1, a first baseline BL1 (e.g. 12 cm) exists between the image capturer 102 and the image capturer 106 and a second baseline BL2 (e.g. 3 cm) exists between the image capturer 102 and the image capturer 104, wherein the image capturers 102, 104, 106, the depth map generator 108, and the mixer 110 are installed on a printed circuit board 112. But, for simplifying FIG. 1, only the image capturers 102, 104, 106 are shown on the printed circuit board 112.

The image capturers 102, 104, 106 are used for forming two image capture pairs, wherein the image capturers 102, 106 form a first image capture pair and the image capturers 102, 104 form a second image capture pair. As shown in FIG. 1, the depth map generator 108 electrically connected to the image capturers 102, 104, 106 is used for generating a depth map corresponding to each image capturer pair of the first image capture pair and the second image capture pair according to an image pair captured by the each image capturer pair. That is, the depth map generator 108 can generate two depth maps DP1, DP2 corresponding to the first image capture pair and the second image capture pair, respectively. As shown in FIG. 2, because a length of the first baseline BL1 is greater than a length of the second baseline BL2, accuracy of the depth map DP1 is higher than accuracy of the depth map DP2, but a valid area of the depth map DP1 is narrower than a valid area of the depth map DP2. That is, a distance D1 corresponding to a maximum disparity of the depth map DP1 is greater than a distance D2 corresponding to a maximum disparity of the depth map DP2.

After the depth map generator 108 generates the depth maps DP1, DP2 corresponding to the first image capture pair and the second image capture pair, the mixer 110 electrically connected to the depth map generator 108 can fuse (merge) the depth maps DP1, DP2 to generate a final depth map FIDP according to a first rule. The first rule includes an invalid area IVA1 (corresponding to the distance D1) of the depth map DP1 corresponding to the first baseline BL1 being replaced with a valid area VA2 of the depth map DP2 (as shown in FIG. 2) corresponding to the second baseline BL2. In addition, an invalid area of a depth map of the present invention can be determined by factors of view angle, baseline, and so on. For example, a disparity d corresponding to the depth map DP1 can be determined according to equation (1):

$$d = RES*BL/(Z*2 \tan(FOV/2)) \quad (1)$$

As shown in equation (1), RES is resolution of the depth map DP1, BL is a baseline (that is, the first baseline BL1) between the image capturers 102, 106, FOV is an view angle of the image capturer 102, 106, and Z is a distance within the depth map DP1 corresponding to an object (that is, a depth within the depth map DP1 corresponding to the object). That is, substituting the maximum disparity corresponding to the depth map DP1, the resolution of the depth map DP1, the view angle of the image capturer 102, and the baseline (that is, the first baseline BL1) between the image capturers 102, 106 into equation (1) can yield a depth (that is, the distance D1) of the invalid area IVA1 corresponding to the depth map DP1.

But, in another embodiment of the present invention, the first rule includes the invalid area IVA1 of the depth map DP1 and a predetermined contiguous area within the depth map DP1 adjacent to the invalid area IVA1 are replaced with a corresponding valid area of the depth map DP2 to prevent the mixer 110 from generating the final depth map FIDP including a part of the invalid area IVA1 of the depth map DP1 because an error of the invalid area IVA1 of the depth map DP1, wherein a range of the predetermined contiguous area can be adjusted according to design requirements or usage scenarios. In addition, because the length of the first baseline BL1 (e.g. 12 cm) is greater than the length of the second baseline BL2 (e.g. 3 cm), when the depth maps DP1, DP2 are represented by disparity, normalization needs to be executed on disparity of the valid area VA2 of the depth map DP2, that is, the disparity of the valid area VA2 of the depth map DP2 needs to be multiplied by a normalization ratio to match disparity of the depth map DP1, wherein the normalization ratio is determined by equation (2):

$$NRA = BL1/BL2 \quad (2)$$

As shown in equation (2), NRA is the normalization ratio, BL1 is the length of the first baseline BL1, and BL2 is the length of the second baseline BL2. Therefore, the final depth map FIDP will include the valid area VA1 of the depth map DP1 and the valid area VA2 of the depth map DP2, wherein the disparity of the valid area VA2 is a normalized disparity.

Figure 3:
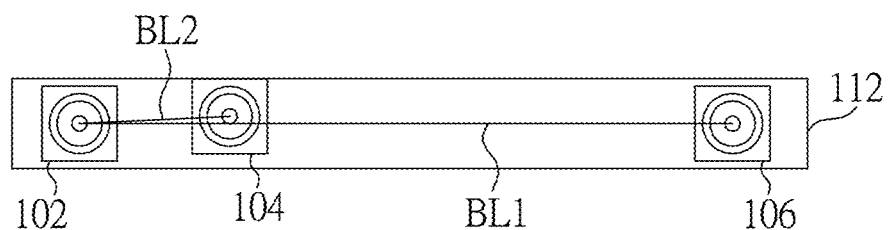
FIG. 3 is a diagram illustrating the first baseline and the second baseline not parallel to each other.

In addition, when the first baseline BL1 and the second baseline BL2 are not parallel to each other (as shown in FIG. 3), the first rule further includes geometric calibration. In one embodiment of the present invention, the geometric calibration is rotation calibration, and the mixer 110 can utilize a rotation matrix to execute geometric conversion on at least one of the depth maps DP1, DP2 to make the first baseline BL1 and the second baseline BL2 parallel to each other. For example, the mixer 110 can utilize a first rotation matrix to rotate the depth map DP1, or can also utilize the first rotation matrix and a second rotation matrix to rotate the depth maps DP1, DP2, respectively. The first rotation matrix and the second rotation matrix correspond to one of the first baseline BL1 and the second baseline BL2, or correspond to a reference line different from the first baseline BL1 and the second baseline BL2.

In addition, in another embodiment of the present invention, when the depth map DP1 and the depth map DP2 are represented by distance, although the accuracy of the depth map DP1 and the accuracy of the depth map DP2 are different (the accuracy of the depth map DP1 is greater than the accuracy of the depth map DP2), because a unit of the distance is identical (e.g. meter), any normalization conversion is not executed on the depth map DP2 to make the depth map DP2 match the depth map DP1.

In addition, in another embodiment of the present invention, the mixer 110 generates the final depth map FIDP according to smoothness of the depth map DP1 and the depth map DP2. For example, in one embodiment of the present invention, when smoothness of edges of a first block of the depth map DP1 is better than smoothness of edges of a first corresponding block of the depth map DP2, the final depth map FIDP generated by the mixer 110 will include the first block of the depth map DP1, wherein the first block includes at least one pixel; when smoothness of edges of a second block of the depth map DP1 is worse than smoothness of edges of a second corresponding block of the depth map DP2, the final depth map FIDP generated by the mixer 110 will include the second corresponding block of the depth map DP2, wherein the second block also includes at least one pixel. In addition, the mixer 110 can compare the smoothness of the depth map DP1 with the smoothness of the depth map DP2 after or before the normalization is executed on the depth map DP2. In addition, in another embodiment of the present invention, after the normalization is executed on the disparity of the depth map DP2, when a difference between an average depth corresponding to a third block of the depth map DP1 and an average depth corresponding to a third corresponding block of the depth map DP2 is greater than a predetermined value, the final depth map FIDP generated by the mixer 110 will include the third corresponding block of the depth map DP2 (because when the difference between the average depth corresponding to the third block of the depth map DP1 and the average depth corresponding to the third corresponding block of the depth map DP2 is greater than the predetermined value, it means that the third block of the depth map DP1 is located at the invalid area IVA1 of the depth map DP1), wherein the third block and the third corresponding block include at least one pixel; when a difference between an average depth corresponding to a fourth block of the depth map DP1 and an average depth corresponding to a fourth corresponding block of the depth map DP2 is less than the predetermined value, the final depth map FIDP generated by the mixer 110 will include the fourth block of the depth map DP1 (because the accuracy of the depth map DP1 is higher than the accuracy of the depth map DP2), wherein the fourth block and the fourth corresponding block also include at least one pixel. In addition, in another embodiment of the present invention, the mixer 110 generates the final depth map FIDP according to at least one of smoothness of each block of the depth map DP1 and smoothness of each block of the depth map DP2, an average depth of each block of the depth map DP1 and an average depth of each block of the depth map DP2, and valid area/invalid area of the depth map DP1 and valid area/invalid area of the depth map DP2.

In addition, the depth map generator 108 can be a field programmable gate array (FPGA) with the above mentioned functions of the depth map generator 108, or an application-specific integrated circuit (ASIC) with the above mentioned functions of the depth map generator 108, or a software module with the above mentioned functions of the depth map generator 108. In addition, the mixer 110 can be a field programmable gate array with the above mentioned functions of the mixer 110, or an application-specific integrated circuit with the above mentioned functions of the mixer 110, or a software module with the above mentioned functions of the mixer 110. In addition, in another embodiment of the present invention, the depth map generator 108 and the mixer 110 can be integrated into a first processor, wherein the first processor can be a field programmable gate array with the above mentioned functions of the depth map generator 108 and the mixer 110, or an application-specific integrated circuit with the above mentioned functions of the depth map generator 108 and the mixer 110.

In addition, when the depth map generation device 100 includes at least four image capturers (can format least three image capture pairs), the first rule includes an invalid area of a depth map corresponding to an $N^{th}$ baseline being replaced with a valid area of a depth map corresponding to an $(N+1)^{th}$ baseline, and disparity of the depth map corresponding to the $N^{th}$ baseline is multiplied by an $N^{th}$ normalization ratio and disparity of the depth map corresponding to the $(N+1)^{th}$ baseline is multiplied by an $(N+1)^{th}$ normalization ratio to make normalized disparity of the depth map corresponding to the $N^{th}$ baseline and normalized disparity of the depth map corresponding to the $(N+1)^{th}$ baseline match disparity of a depth map corresponding to the first baseline BL1, wherein the length of the first baseline BL1 is greater than lengths of other baselines of baselines corresponding to the at least three image capture pairs different from the first baseline BL1, a length of the $N^{th}$ baseline is greater than a length of the $(N+1)^{th}$ baseline, and N is a positive integer.

Figure 4:
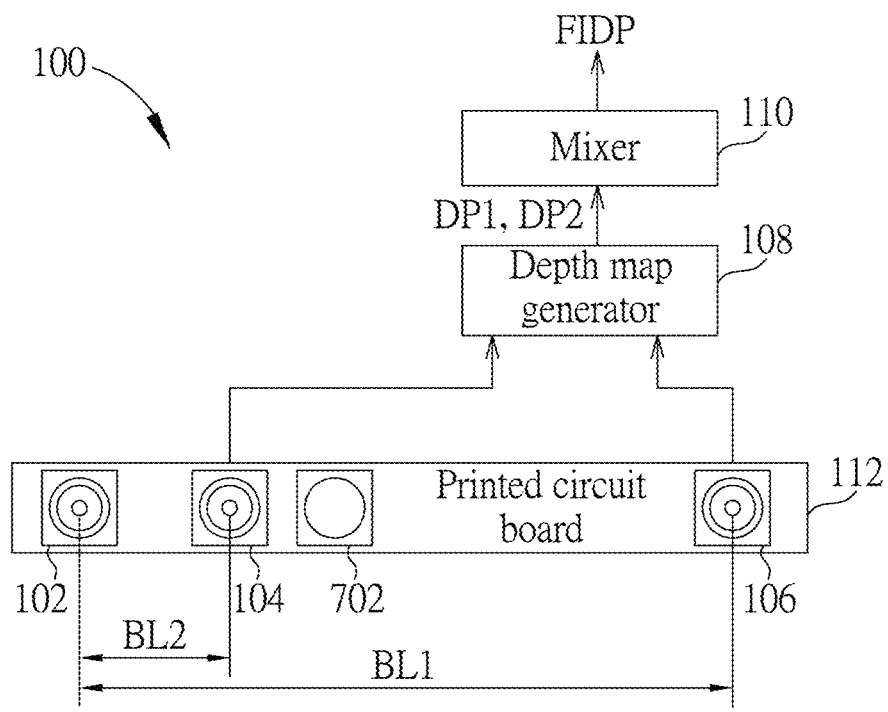
FIG. 4 is a diagram illustrating the depth map generation device further including a light source.

Please refer to FIG. 4. FIG. 4 is a diagram illustrating the depth map generation device further including a light source. As shown in FIG. 4, the depth map generation device 100 includes the image capturers 102, 104, 106, a light source 702, the depth map generator 108, and the mixer 110, wherein in one embodiment of the present invention, the light source 702 can be an infrared light source for emitting structured light (or a random pattern), and a function of the light source 702 is used for making better quality of the depth maps DP1, DP2 generated by the depth map generation device 100. But, the present invention is not limited to light source 702 being an infrared light source. That is, the light source 702 can be other type of light sources (e.g. the light source 702 can be a visible light source). Or, in another embodiment of the present invention, the depth map generation device 100 can also include at least one infrared laser light source. Taking the depth map generation device 100 as an example, the light source 702 is turned on according to at least one of luminance of an environment which the depth map generation device 100 is located at, the quality of the depth map DP1 (or the depth map DP2, and a difference of the depth map DP1 (or the depth map DP2) corresponding to turning-on and turning-off of the light source 702.

When the light source 702 is turned on according to the luminance of the environment which the depth map generation device 100 is located at, a controller (not shown in FIG. 4) can determine the luminance of the environment which the depth map generation device 100 is located at according to at least one of a shutter time, an exposure time, and an ISO gain currently set by an image capturer (e.g. the image capturer 102, the image capturer 104, or the image capturer 106). Taking the exposure time as an example, in one embodiment of the present invention, when the shutter time of the image capturer 102 is fixed (or the image capturer 102 has no shutter), the controller can determine whether to turn on the light source 702 according to a value GEX generated by equation (3):

$$GEX = gain * EXPT \quad (3)$$

As shown in equation (3), "gain" shown in equation (3) is the ISO gain corresponding to the image capturer 102 and "EXPT" shown in equation (3) is the exposure time corresponding to the image capturer 102. When the value GEX is greater than a high threshold value, it means that the luminance of the environment which the depth map generation device 100 is located at is too dark, so the controller turns on the light source 702; and when the value GEX is less than a low threshold value, it means that the luminance of the environment which the depth map generation device 100 is located at is bright enough, so the controller turns off the light source 702, wherein the high threshold value is greater than the low threshold value. In addition, when a maximum value of the value GEX (corresponding to a maximum exposure time and a maximum gain of the image capturer 102) cannot be always greater than the high threshold value, the controller can turn on the light source 702 according to current luminance of the environment which the depth map generation device 100 is located at.

When the light source 702 is turned on according to the quality of the depth map DP1, the controller can determine the quality of the depth map DP1 according to at least one of a number of pixels with invalid values within the depth map DP1 and smoothness of the depth map DP1. For example, in one embodiment of the present invention, the controller can determine whether to turn on the light source 702 according to a value COST generated by equation (4):

$$COST = a * mean(HPF(x)) + b * invalid\_cnt(x) \quad (4)$$

As shown in equation (4), "HPF(x)" shown in equation (4) corresponds to a response of a high pass filter (because the smoothness of the depth map DP1 corresponds to high frequency areas of the depth map DP1), "mean(HPF(x))" shown in equation (4) corresponds to an average of the response of the high pass filter (but, in another embodiment of the present invention, "mean(HPF(x))" shown in equation (4) can be replaced with a sum corresponding to the response of the high pass filter), "invalid_cnt(x)" shown in equation (4) represents the number of the pixels of with the invalid values, "x" shown in equation (4) represents the depth map DP1, and "a, b" shown in equation (4) are coefficients. When the value COST is greater than a threshold value, it means that the luminance of the environment which the depth map generation device 100 is located at is too dark or shot objects of the depth map DP1 have no texture, so the controller turns on the light source 702. In addition, after the light source 702 is turned on for a predetermined time, the controller can attempt to turn off the light source 702 and make the image capturer 102 capture at least one image, and then the controller calculates a cost value corresponding to the at least one image according to equation (4). If the cost value corresponding to the at least one image is still greater than the threshold value, the controller turns on the light source 702 again and executes the above mentioned operation again after the controller turns on the light source 702 for the predetermined time; and if the cost value corresponding to the at least one image is less than the threshold value, the controller turns off the light source 702 until the cost value corresponding to the at least one image is greater than the threshold value again.

In addition, the controller can turn on and turn off the light source 702, and determine the quality of the depth map DP1 according to the difference of the depth map DP1 corresponding to turning-on and turning-off of the light source 702. If the difference of the depth map DP1 corresponding to turning-on and turning-off of the light source 702 is less than a reference value, it means that turning-on and turning-off of the light source 702 does not influence the quality of the depth map DP1, so the controller can turn off the light source 702.

In addition, after the light source 702 is turned on, the controller can optionally adjust intensity of the light source 702 according to luminance corresponding to a plurality of images captured by the image capturers 102, 104, 106 and a target value, wherein the target value is set according to reflection coefficient of a human skin of a user corresponding to the structured light emitted by the light source 702. For example, the controller can generate a luminance distribution map corresponding to the plurality of images according to the plurality of images, and optionally adjust the intensity of the light source 702 according to a percentage of the depth map DP1 occupied by an area corresponding to a maximum luminance value of at least one luminance value within the luminance distribution map greater than the target value. In addition, in another embodiment of the present invention, the controller can generate average luminance corresponding to the plurality of images according to the plurality of images, and optionally adjust the intensity of the light source 702 according to the average luminance and the target value. In addition, in another embodiment of the present invention, the controller can generate a luminance histogram corresponding to a plurality of pixels of the plurality of images according to the plurality of images, and optionally adjust the intensity of the light source 702 according to a median of the luminance histogram and the target value, or according to a quartile of the luminance histogram and the target value.

In addition, in another embodiment of the present invention, after the light source 702 is turned on, the controller can optionally dynamically adjust the intensity of the light source 702 according to a distance between at least one predetermined object within the plurality of images and the image capturer (e.g. the image capturer 102, the image capturer 104, or the image capturer 106) and a first lookup table, wherein the first lookup table stores relationships between a distance corresponding to an object and the intensity of the light source 702. In addition, in another embodiment of the present invention, the controller can optionally dynamically adjust the intensity of the light source 702 according to the distance between the at least one predetermined object within the plurality of images and the image capturer (e.g. the image capturer 102, the image capturer 104, or the image capturer 106) and a first correlation formula.

In addition, in another embodiment of the present invention, the controller continuously detects the luminance of the environment which the depth map generation device 100 is located at under the light source 702 being turned off. When the luminance of the environment is brighter, the controller increases the intensity of the light source 702 (when the light source 702 is turned on) according to a second lookup table, wherein the second lookup table stores relationships between the intensity of the light source 702 (when the light source 702 is turned on) and the luminance of the environment. In addition, in another embodiment of the present invention, when the luminance of the environment is brighter, the controller increases the intensity of the light source 702 (when the light source 702 is turned on) according to a second correlation formula.

In addition, in another embodiment of the present invention, after the controller first turns off the light source 702, the controller detects the luminance of the environment. Then, according to an automatic exposure (AE) algorithm well-known to one of ordinary skill in the art, the controller utilizes the exposure time (or at least one of the shutter time, the exposure time, and the ISO gain) of the image capturer (e.g. the image capturer 102, the image capturer 104, or the image capturer 106) to make the luminance of the environment be reduced to not to interfere with the image capturer (e.g. the image capturer 102, the image capturer 104, or the image capturer 106), and fixes a current exposure time of the image capturer (e.g. the image capturer 102, the image capturer 104, or the image capturer 106). Then, the controller turns on the light source 702 and detects the intensity of the light source 702 until the intensity of the light source 702 is up to the target value.

Figure 5A:
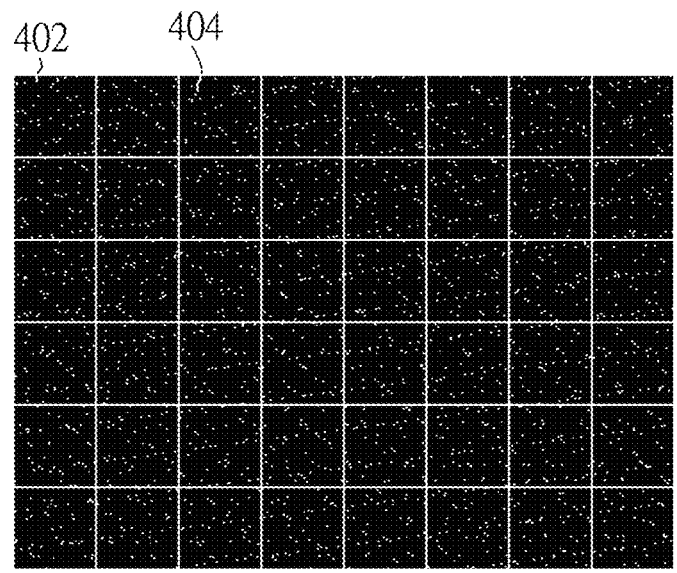
FIG. 5A is a diagram illustrating the first coding pattern.
Figure 5B:
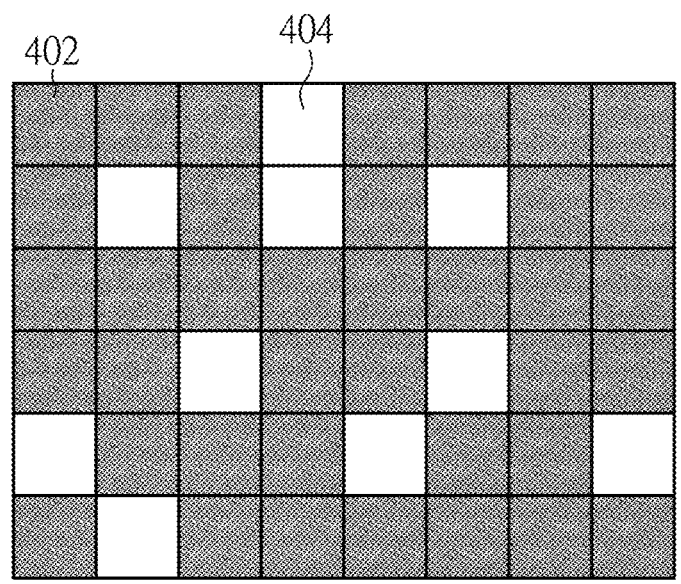
FIG. 5B is a diagram illustrating the second coding pattern.
Figure 6:
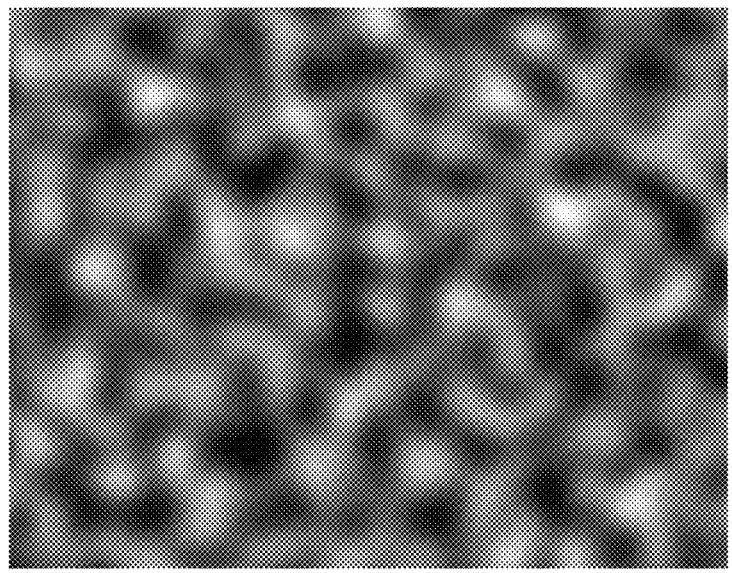
FIG. 6 is a diagram illustrating the third coding pattern.

In addition, in one embodiment of the present invention, the structured light provided by the light source 702 is a coding pattern (corresponding to a random pattern). But, in another embodiment of the present invention, the structured light can combine a first coding pattern with a second coding pattern. Please refer to FIGS. 5A, 5B. FIG. 5A is a diagram illustrating the first coding pattern, and FIG. 5B is a diagram illustrating the second coding pattern. As shown in FIG. 5A, the first coding pattern is divided into a plurality of blocks according to the second coding pattern, and then the second coding pattern is applied to the plurality of blocks to form the structured light. For example, as shown in FIG. 5B, when the second coding pattern is applied to a block 402 of the plurality of blocks, luminance of pixels within the block 402 needs to be reduced. That is, only luminance of pixels within the block 402 being turned on needs to be reduced, and other pixels within the block 402 not being turned on need to be turned off continuously. In addition, as shown in FIG. 5B, when the second coding pattern is applied to a block 404 of the plurality of blocks, luminance of pixels within the block 404 needs to be increased. That is, only luminance of pixels within the block 404 being turned on needs to be increased, and other pixels within the block 404 not being turned on need to be turned off continuously to form the structured light. In addition, in another embodiment of the present invention, when the second coding pattern is applied to the plurality of blocks, luminance of pixels within each block of the plurality of blocks being turned on can have multi-level changes. In addition, in another embodiment of the present invention, a third coding pattern shown in FIG. 6 can be also applied to the first coding pattern (as shown in FIG. 5A) to form the structured light.

Figure 7:
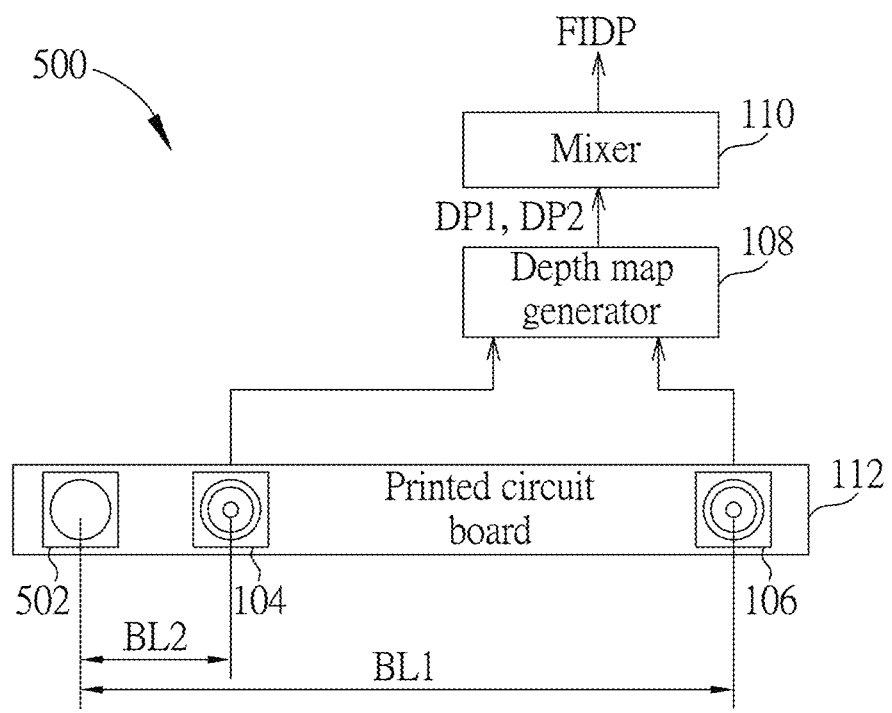
FIG. 7 is a diagram illustrating a depth map generation device for merging multiple depth maps according to a second embodiment of the present invention.

Please refer to FIG. 7. FIG. 7 is a diagram illustrating a depth map generation device 500 for merging multiple depth maps according to a second embodiment of the present invention, wherein the depth map generation device 500 includes two image capturers 104, 106, a light source 502, a depth map generator 108, and a mixer 110. But, the present invention is not limited to the depth map generation device 500 only including the two image capturers 104, 106. That is, the depth map generation device 500 can include more than three image capturers. In addition, the light source 502 and the image capturers 104, 106 form two image capture pairs respectively, wherein the light source 502 and the image capturer 106 form a first image capture pair and the light source 502 and the image capturer 104 form a second image capture pair. As shown in FIG. 7, a first baseline BL1 (e.g. 12 cm) exists between the light source 502 and the image capturer 106 and a second baseline BL2 (e.g. 3 cm) exists between the light source 502 and the image capturer 104. As shown in FIG. 7, the depth map generator 108 is electrically connected to the image capturers 104, 106 for generating a depth map corresponding to each image capturer pair of the first image capture pair and the second image capture pair according to an image including the structured light captured by the each image capturer pair. That is, the depth map generator 108 will generate two depth maps corresponding to the first image capture pair and the second image capture pair (wherein effective ranges of the two depth maps corresponding to the first image capture pair and the second image capture pair can be referred to FIG. 2). In addition, operational principles of the depth map generator 108 and the mixer 110 of the depth map generation device 500 can be referred to operational principles of the depth map generator 108 and the mixer 110 of the depth map generation device 100, so further description thereof is omitted for simplicity. In addition, operational principles of the light source 502 can also be referred to operational principles of the light source 702, so further description thereof is also omitted for simplicity.

Figure 8:
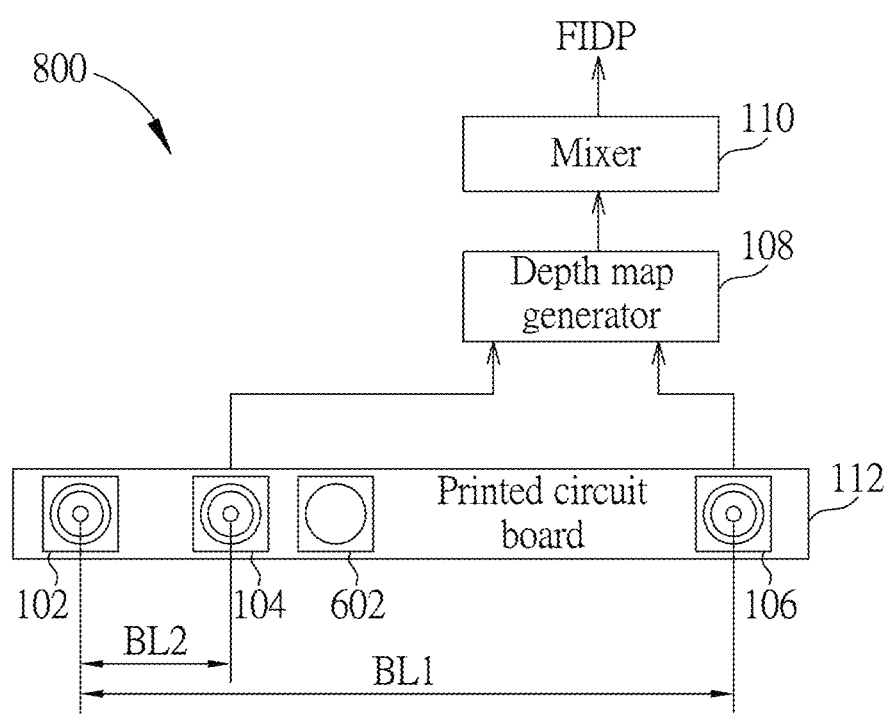
FIG. 8 is a diagram illustrating a depth map generation device for merging multiple depth maps according to a third embodiment of the present invention.

In addition, please refer to FIG. 8. FIG. 8 is a diagram illustrating a depth map generation device 800 for merging multiple depth maps according to a third embodiment of the present invention, wherein the depth map generation device 800 includes image capturers 102, 104, 106, a light source 602, a depth map generator 108, and a mixer 110, wherein the depth map generator 108 is coupled to the image capturers 102, 104, 106, and the image capturers 102, 104, 106 and the light source 602 form an image capture module. But, in another embodiment of the present invention, the depth map generation device 800 can include at least three image capturers and at least one light source. As shown in FIG. 8, the image capturers 102, 104, 106 form two first image capture pairs, and the light source 602 and the image capturers 102, 104, 106 form three second image capture pairs respectively, wherein the three second image capture pairs are used for capturing images including structured light generated by the light source 602. Therefore, the depth map generator 108 can be used for generating at least two depth maps corresponding to at least two image capture pairs of the two first image capture pairs and the three second image capture pairs according to images captured by the at least two image capture pairs. In addition, operational principles of the three second image capture pairs can be referred to operational principles of the first image capture pair (composed of the light source 502 and the image capturer 106) of the depth map generation device 500 and the second image capture pair (composed of the light source 502 and the image capturer 104) of the depth map generation device 500 shown in FIG. 7, so further description thereof is omitted for simplicity. In addition, operational principles of the two first image capture pairs can be referred to operational principles of the first image capture pair (composed of the image capturers 102, 106) of the depth map generation device 100 and the second image capture pair (composed of the image capturers 102, 104) of the depth map generation device 100, so further description thereof is omitted for simplicity. In addition, subsequent operational principles of the depth map generation device 800 can be referred to the operational principles of the depth map generation devices 500, 100, so further description thereof is omitted for simplicity.

To sum up, the depth map generation device provided by the present invention utilizes at least three image capturers (or at least two image capturers and a light source) to generate at least two depth maps corresponding to at least two baselines, wherein the at least two depth maps corresponding to the at least two baselines have at least two characteristics. Then, the present invention can generate a final depth map according to the at least two depth maps with the at least two characteristics. Therefore, compared to the prior art, the present invention can enlarge a range of the final depth map, or increase accuracy of the final depth map.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A depth map generation device for merging multiple depth maps, comprising:
    at least two image capturers;
    a light source emitting structured light, wherein the light source and the at least two image capturers form at least two image capture pairs, respectively;
    a depth map generation circuit coupled to the at least two image capturers for generating a depth map corresponding to each image capturer pair of the at least two image capture pairs according to an image comprising the structured light captured by the each image capturer pair; and
    a mixing circuit coupled to the depth map generation circuit for merging at least two depth maps corresponding to the at least two image capture pairs to generate a final depth map according to smoothness of each block of the at least two depth maps, and the at least two depth maps have different characteristics.

2. The depth map generation device of claim 1, wherein the each image capturer pair has a baseline, and the at least two depth maps correspond to at least two baselines.

3. The depth map generation device of claim 1, wherein the mixing circuit merges a first depth map of the at least two depth maps and a second depth map of the at least two depth maps to generate the final depth map according to smoothness of each block of the first depth map and smoothness of a corresponding block of the second depth map, and both the each block of the first depth map and the corresponding block of the second depth map comprise at least one pixel.

4. The depth map generation device of claim 1, wherein the at least two image capture pairs have a same optical center.

5. The depth map generation device of claim 1, wherein the at least two depth maps are represented by disparity.

6. The depth map generation device of claim 1, wherein when the mixing circuit merges the at least two depth maps to generate the final depth map, the mixing circuit executes an operation on at least one of the at least two depth maps to make disparities of the at least two depth maps match each other.

7. A depth map generation device for merging multiple depth maps, comprising:

an image capture module comprising at least two image capture pairs, and each image capturer pair of the at least two image capture pairs is composed of two image capturers, or composed of an image capturer and a light source;

a depth map generation circuit coupled to the image capture module for generating at least two depth maps corresponding to the at least two image capture pairs according to images captured by the at least two image capture pairs; and a mixing circuit coupled to the depth map generation circuit for merging the at least two depth maps to generate a final depth map, wherein the at least two depth maps have different characteristics;

wherein when the mixing circuit merges the at least two depth maps to generate the final depth map, the mixing circuit executes normalization on at least one of the at least two depth maps to make disparities of the at least two depth maps match each other.

8. The depth map generation device of claim 7, wherein the at least two image capture pairs have a same optical center.

9. The depth map generation device of claim 7, wherein the at least two depth maps are represented by disparity.

* * * * *